United States Patent
Brady

[15] 3,674,750
[45] July 4, 1972

[54] QUARTERNARY PHOSPHONIUM SALT CATALYZED SYNTHESIS OF URETHANES AND POLYURETHANES

[72] Inventor: Donnie G. Brady, Bartlesville, Okla.
[73] Assignee: Phillips Petroleum Company
[22] Filed: Jan. 14, 1971
[21] Appl. No.: 106,545

[52] U.S. Cl. ............... 260/77.5 R, 260/2.5 AB, 260/2.5 AC, 260/75 NB, 260/75 NC, 260/77.5 AB, 260/77.5 AC, 260/482 B, 260/482 C
[51] Int. Cl. ........................................................ C08g 22/34
[58] Field of Search .................. 260/77.5 R, 77.5 AB, 75 NB, 260/77.5 B, 77.5 AC, 482 C

[56] References Cited

UNITED STATES PATENTS 3,526,624  9/1970  Argabright ....................... 260/77.5 R

*Primary Examiner*—Donald E. Czaja
*Assistant Examiner*—M. J. Welsh
*Attorney*—Young and Quigg

[57] ABSTRACT

A process for producing urethanes by reacting an alkyl halide and an alkali metal cyanate in the presence of an organo hydroxy compound employing a phosphonium salt as a catalyst in which process the isolation of the intermediate isocyanate is unnecessary.

8 Claims, No Drawings

QUARTERNARY PHOSPHONIUM SALT CATALYZED SYNTHESIS OF URETHANES AND POLYURETHANES

This invention relates to the production of urethanes and poly-urethanes.

In one of its more specific aspects, this invention relates to the use of quarternary phosphonium salts as catalysts in the synthesis of polyurethanes.

Urethanes, which can be produced as the product of the reaction of an isocyanate with a hydroxyl compound, are used in medicinal applications and as agricultural chemicals. Polyurethanes are employed in forming desirable foams, films and coatings.

Prior art methods of producing urethanes involves the formation of an isocyanate which usually requires isolation and separate treatment to convert it to the urethane. This invention provides a method by which the conversion of the isocyanate to the corresponding urethane can be carried out without the intermediate isolation of the isocyanate.

In the method of this invention, the urethane is produced from the reaction of an alkyl halide and an alkali metal cyanate in the presence of an organo hydroxy compound and a phosphonium salt catalyst without the isolation of the isocyanate intermediate.

If an organo dihalide and an organo dihydroxy compound are employed under comparable conditions, a polyurethane is formed.

The organo monohalides which can be used are those containing a halogen selected from the group consisting of chlorine, bromine and iodine with the halogen being attached to a saturated or unsaturated aliphatic radical which can have aromatic substituents. Other substituents, inert to the reaction, such as alkoxyl groups, can also be present. Examples of suitable monohalides include ethyl bromide, allyl chloride, 2-bromobutane, 1-chloropropane, 2-chloropropane, 1-chloropentane, 1-chloroeicosane, 2-bromoethyl ether, bromomethylcyclohexane and alpha-chlorotoluene.

Suitable organo dihalides will preferably have at least two carbon atoms, the halogen atoms being attached to different carbon atoms. Examples of suitable compounds include 1,10-dibromodecane, 1,12-dibromotetradecane, alpha-, alpha'-dichloro-p-xylene, bis(2-chloroethyl)ether and 1,5-dibromohexene-3.

The alkali metal cyanates which can be employed include the cyanates of sodium, lithium, potassium, rubidium, and cesium. Thiocyanates of these alkali metals can also be used.

The phosphonium salt catalysts which are suitable for use are quarternary phosphonium salts having the general formula $$(R^1R^2R^3R^4P)_nX$$

in which $R^1$, $R^2$, $R^3$ and $R^4$ are hydrocarbyls containing from 1 to about 8 carbon atoms, and include such groups as alkyl, cycloalkyl, aryl and combinations thereof such as aralkyl, alkaryl and the like, and in which formula $R^1$, $R^2$, $R^3$ and $R^4$ can be identical or different; P is phosphorous; X can be selected from groups such as —O—CO—R, —O—SO$_2$—R, —F, —Cl, —Br, —CN, —OCN, —NCO, = SO$_4$, —HSO$_4$, = PO$_4$, = HPO$_4$, —H$_2$PO$_4$, —NO$_3$, —O—CO—R'—CO—O—, —O—SO$_2$R'—SO$_2$O—, and any other nondeleterious anionic group having a valence within the range of from 1 to 3 and in which groups R and R' are hydrocarbyl groups. The R' in the X group can be like R in all respects except that R' will have a valence of 2 and will have from six to 10 carbon atoms. In the above formula, n is the valence of the X group.

Examples of suitable phosphonium salt catalysts include tetrabutylphosphonium nitrate, ethyltriphenylphosphonium bromide, p-tolyltrimethylphosphonium phosphate and di(tetrabutyl)phosphonium succinate.

Monohydroxy compounds which can be used are those in which the hydroxy group can be attached to a radical with is hydrocarbyl, the hydrocarbyl radical being alkyl, alkenyl, cycloalkyl, aryl or combinations thereof such as aralkyl, alkaryl and the like. Suitable monohydroxy compounds include allyl alcohol, isobutyl alcohol, 2-hexanol, 1-tetradecanol, cyclohexanol, ethanol, benzyl alcohol, cinnamyl alcohol and p-cresol.

Dehydroxy compounds which can be used are those which have two hydroxyl groups attached to the radical, as defined supra. Suitable compounds include ethylene glycol, 1,4-butanediol, 3-phenyl-1,2-propanediol, 2,2-dimethyl-1,3-propanediol and resorcinol.

While the foregoing is expressed in terms of mono- and dihalides and/or hydroxyl compounds, tri- or higher degrees of functionality can be employed.

In the process of this invention, the reaction is conducted employing the cyanate or thiocyanate groups, the hydroxyl groups and the halogen atoms in the ratio of about 1:1:1. The mole ratio of catalyst to alkali metal cyanate or thiocyanate will be in the range of about 0.0001 to about 5 and preferably about 0.01 to 0.05.

While the reaction can be carried out over a wide temperature range, it will generally be conducted within the range of about 20° to about 300° C., usually within the range of about 50° to 250° C., and at a pressure which maintains the reaction mixture substantially in the liquid phase.

The reaction time will generally be within the range of about 2 minutes to about 18 hours. The reaction can be conducted in an exess of either the haloorganic compound or the hydroxyl compound which then serves as the solvent. However, it is preferable that a polar solvent be used, this polar solvent not reacting with any reactant or product concerned in the reaction. Preferred polar solvents are tertiary amides such as N,N-dimethylformamide, N,N-dimethylacetamide, N-methyl-N-phenylformamide, N-methylpyrrolidone, and nitriles such as acetonitrile and propionitrile. The concentration of the reactants in the solvent can vary such that the weight percent of the reactants is from about 10 to about 95 of the total weight involved, preferably 20 to 80 weight percent.

The following examples will serve to illustrate the method of this invention but are not to be considered as limiting the invention to the specifics involved.

EXAMPLE I

Run I demonstrates the production of urethane in acetonitrile solvent in the absence of the method of this invention. Run II was conducted under substantially identical conditions but employed the method of this invention, using ethyltriphenylphosphonium bromide as the catalyst.

Results were as follows:

| Run No. | I | II |
|---|---|---|
| Reactants | | |
| Potassium cyanate, mole | 0.15 | 0.15 |
| Allyl chloride, mole | 0.10 | 0.10 |
| Ethanol, mole | 0.17 | 0.17 |
| Solvent | | |
| Acetonitrile, ml | 40 | 40 |
| Catalyst | | |
| Ethyltriphenylphosphonium bromide, mole | 0 | 0.005 |
| Reaction Conditions | | |
| Temperature, °C. | 100 | 100 |
| Reaction Time, hours | 5.5 | 4 |
| Product | | |
| Ethyl N-allylurethane, % of theoretical (gas-liquid chromatography) | 14 | 55 |

These data indicate an increase in yield of urethane from 14 percent of theoretical to 55 percent when employing the method of this invention.

EXAMPLE II

The following runs indicate the method of this invention employing various alkyl halides.

| Run No. | III | IV | V | VI |
|---|---|---|---|---|
| Reactants | | | | |
| Potassium cyanate, mole | 0.15 | 0.15 | 0.15 | 0.15 |
| Alkyl halide | ethyl-bromide | 1-chloro-propane | 2-chloro-propane | 1-chloro-pentane |

| | | | | |
|---|---|---|---|---|
| Alkyl halide, mole | 0.25 | 0.25 | 0.25 | 0.25 |
| Ethanol, mole | 1.29 | 0.25 | 0.25 | 0.25 |
| Ethyltriphenyl-phosphonium bromide, mole | 0.005 | 0.005 | 0.005 | 0.005 |
| Acetonitrile, ml. | 0 | 50 | 50 | 50 |
| Reaction conditions Temperature, °C. | 100 | 125 | 125 | 125 |
| Reaction Time, hours | 4.5 | 6.75 | 6.75 | 9 |
| Yield Product | ethyl N-ethylurethane | ethyl N-1-propyl-urethane | ethyl N-2-propyl-urethane | ethyl N-1-pentane-urethane |
| Yield, % of theoretical | 54[1] | 43.3[2] | 25.4[2] | 29.4[1] |

[1] By gas-liquid chromatography.
[2] By distillation.

The above data indicate the operability of the method of this invention with a variety of alkyl halides.

EXAMPLE III

The following run illustrates the method of this invention when employing difunctional reactants. Results were as follows:

A mixture of 0.115 mole potassium cyanate, 0.004 mole ethyltriphenylphosphonium bromide, 0.057 mole 1,4-butanediol and 100 ml of N,N-dimethylformamide were maintained under reaction conditions of 125° C. as a solution of 0.057 mole alpha,alpha'-dichloro-p-xylene in 30 ml of N,N-dimethylformamide was added dropwise over a 1 hour period. Thereafter, the mixture was maintained at 125° C. for 2 hours.

The polymer solid was recovered, acetone-washed, and air-dried and amounted to a yield of 90 percent of theoretical.

It will be evident from the foregoing that various modifications can be made to the method of this invention. Such, however, are considered as being within the scope of the invention.

What is claimed is:

1. A process for the production of a urethane which comprises contacting an alkyl halide, an alkali metal cyanate, an organo hydroxy compound and a phosphonium salt catalyst under conditions to produce said urethane and recovering said urethane, said phosphonium salt catalyst having the general formula $$(R^1R^2R^3R^4P)_nX$$

in which $R^1$, $R^2$, $R^3$, $R^4$ are hydrocarbyl containing one to about eight carbon atoms, P is phosphorous and X is an anionic group having a valence within the range of from 1 to 3, and n is the valence of said group X.

2. The process of claim 1 in which $R^1$, $R^2$, $R^3$ and $R^4$ are identical and in which X is selected from the group consisting of $—O—CO—R$, $—O—SO_2R$, $—F$, $—Cl$, $—Br$, $—CN$, $—OCN$, $—NCO$, $=SO_4$, $—HSO_4$, $=PO_4$, $=HPO_4$, $—H_2PO_4$, $—NO_3$, $—O—CO—R'—CO—O—$, $—O—SO_2—R'—SO_2—O—$ in which R and R' are hydrocarbyl groups and R' has a valence of 2 and contains from six to 10 carbon atoms.

3. The method of claim 1 in which said phosphonium salt catalyst is selected from the group consisting of tetrabutylphosphonium nitrate, ethyltriphenylphosphonium bromide, p-tolyltrimethylphosphonium phosphate and di(tetrabutyl)phosphonium succinate.

4. The method of claim 1 in which said alkyl halide is an organo dihalide and said organo hydroxy compound is an organo dihydroxy compound and said urethane is a polyurethane.

5. The method of claim 1 in which said catalyst is present in an amount from 0.001 to about 5 mole per mole of said alkali metal cyanate.

6. The method of claim 1 in which said urethane is produced by contacting potassium cyanate, allyl chloride, ethanol and ethyltriphenylphosphonium bromide in acetonitrile at a temperature of 100° C.

7. The method of claim 1 in which said urethane is produced by contacting potassium cyanate, ethyl bromide, ethanol and ethyltriphenylphosphonium bromide at a temperature of 100° C.

8. The method of claim 1 in which said urethane is produced by contacting potassium cyanate, 1,4-butanediol, alpha,alpha'-dichloro-p-xylene and ethyltriphenylphosphonium bromide in N,N-dimethylformamide at a temperature of 125° C.

* * * * *

UNITED STATES PATENT OFFICE

CERTIFICATE OF CORRECTION

Patent No. 3,674,750            Dated: July 4, 1972

Donnie C. Brady

It is certified that error appears in the above-identified patent and that said Letters Patent are hereby corrected as shown below:

Column 1, line 56, "=PO$_4$" should read --- ≡PO$_4$ ---; column 4, line 14, "=PO$_4$" should read --- ≡PO$_4$ ---; column 4, line 27, "0.001" should read --- 0.0001 ---.

Signed and sealed this 12th day of December 1972.

(SEAL)
Attest:

EDWARD M. FLETCHER, JR.            ROBERT GOTTSCHALK
Attesting Officer            Commissioner of Patents